US012631664B1

(12) United States Patent

Galambos et al.

(10) Patent No.: US 12,631,664 B1
(45) Date of Patent: May 19, 2026

(54) INTERTIAL SENSOR THAT INCLUDES FLUIDS

(71) Applicant: National Technology & Engineering Solutions of Sandia, LLC, Albuquerque, NM (US)

(72) Inventors: Paul C. Galambos, Albuquerque, NM (US); Cayden Boll, Albuquerque, NM (US); Alex Chen, Albuquerque, NM (US); Joshua Allen Dye, McKinney, TX (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 279 days.

(21) Appl. No.: 18/534,868

(22) Filed: Dec. 11, 2023

(51) Int. Cl.
| | |
|---|---|
| *G01F 15/00* | (2006.01) |
| *G01C 19/14* | (2006.01) |
| *G01P 1/02* | (2006.01) |
| *G01P 15/00* | (2006.01) |
| *G01P 15/09* | (2006.01) |

(Continued)

(52) U.S. Cl.
CPC ............ *G01P 15/006* (2013.01); *G01C 19/14* (2013.01); *G01P 1/023* (2013.01); *G01P 15/0907* (2013.01); *G01P 15/14* (2013.01); *G01P 15/18* (2013.01)

(58) Field of Classification Search
CPC .... G01P 15/006; G01P 1/023; G01P 15/0907; G01P 15/14; G01P 15/18; G01C 19/14
See application file for complete search history.

(56) References Cited

U.S. PATENT DOCUMENTS

| | | | |
|---|---|---|---|
| 3,121,336 | A | 2/1964 | Riordan |
| 3,147,391 | A | 9/1964 | Bernard et al. |

(Continued)

FOREIGN PATENT DOCUMENTS

| | | | | |
|---|---|---|---|---|
| CN | 106124802 A | * | 11/2016 | .............. G01P 15/12 |
| DE | 102010053038 A1 | * | 7/2011 | .............. G01C 9/18 |
| EP | 1843129 A2 | * | 10/2007 | .............. G01C 19/00 |

OTHER PUBLICATIONS

Furmidge, C.G.L., "Studies at Phase Interfaces I. The Sliding of Liquid Drops on Solid Surfaces and Theory for Spray Retention", Journal of Colloid Science (1962) 17:309-324.

(Continued)

*Primary Examiner* — Benjamin R Schmitt
(74) *Attorney, Agent, or Firm* — Calfee, Halter & Griswold LLP; Mark A. Dodd

(57) ABSTRACT

A sensor system described herein includes a container having a first end and a second end that is opposite the first end. The container includes a first fluid adjacent to the first end of the container and a second fluid that is adjacent to the second end of the container. A third fluid, having a density greater than the first and second fluids, separates the first and second fluids within the container. The sensor system also includes a sensor apparatus that is adapted to output data that is indicative of acceleration of a platform that includes the sensor system, where the data is representative of at least one of: 1) location of an interface between the first fluid and the third fluid in the container; or 2) pressure at the first end of the container caused by compression of the first fluid by the third fluid.

20 Claims, 6 Drawing Sheets

(51) Int. Cl.
    *G01P 15/14*         (2013.01)
    *G01P 15/18*         (2013.01)

(56)            References Cited

U.S. PATENT DOCUMENTS 3,232,119 A     2/1966   Salerno
3,292,439 A  *  12/1966  Yavne ..................... G01C 19/14
                                      74/5.6 A

OTHER PUBLICATIONS

Kim, J. et al., "A Micromechanical Switch with Electrostatically Drive Liquid-Metal Droplet", Sensors and Actuators A (2002) 97-98:672-679.
Kim, C.-J. et al., "Electrowetting-Based Driving of Metal Droplet for Reliable RF Switching", Airforce Research Laboratory Final Report AFRL-VS-PS-TR-2005-1186, 2005, 16 pages.
Lee, J. et al., "Surface-Tension-Driven Microactuation Based on Continuous Electrowetting", Journal of Microelectromechanical Systems (2000) 9(2):171-180.
Park, U. et al., "Development of a MEMS Digital Accelerometer (MDA) Using a Microscale Liquid Metal Droplet in a Microstructured Photosensitive Glass Channel", Sensors and Actuators A: Physical (2010) 159:51-57.
Shen, W. et al., "Electrostatically Actuated Metal-Droplet Microswitches Integrated on CMOS Chip", Journal of Microelectromechanical Systems (2006) 15(4):879-889.
Smithwick III, R. Wi, "Contact Angle Studies of Microscopic Mercury Droplets on Glass", Journal of Colloid and Interface Science (1988) 123(2):482-485.
Yuan, Z. et al., "Facile Method to Prepare Lotus-Leaf-Like Super-Hydrophobic Poly(vinyl Chloride) Film", Applied Surface Science (2008) 254:1593-1598.
Zeng, H. et al., "Liquid-State Motion Sensing", Sensors and Actuators B: Chemical (2011) 154:33-40.
Zhang, L. et al., "Superhydrophobic Behaviour of a Perfluoropolyether Lotus-Leaf-Like Topography", Langmuir (2006) 22:8576-8580.

* cited by examiner

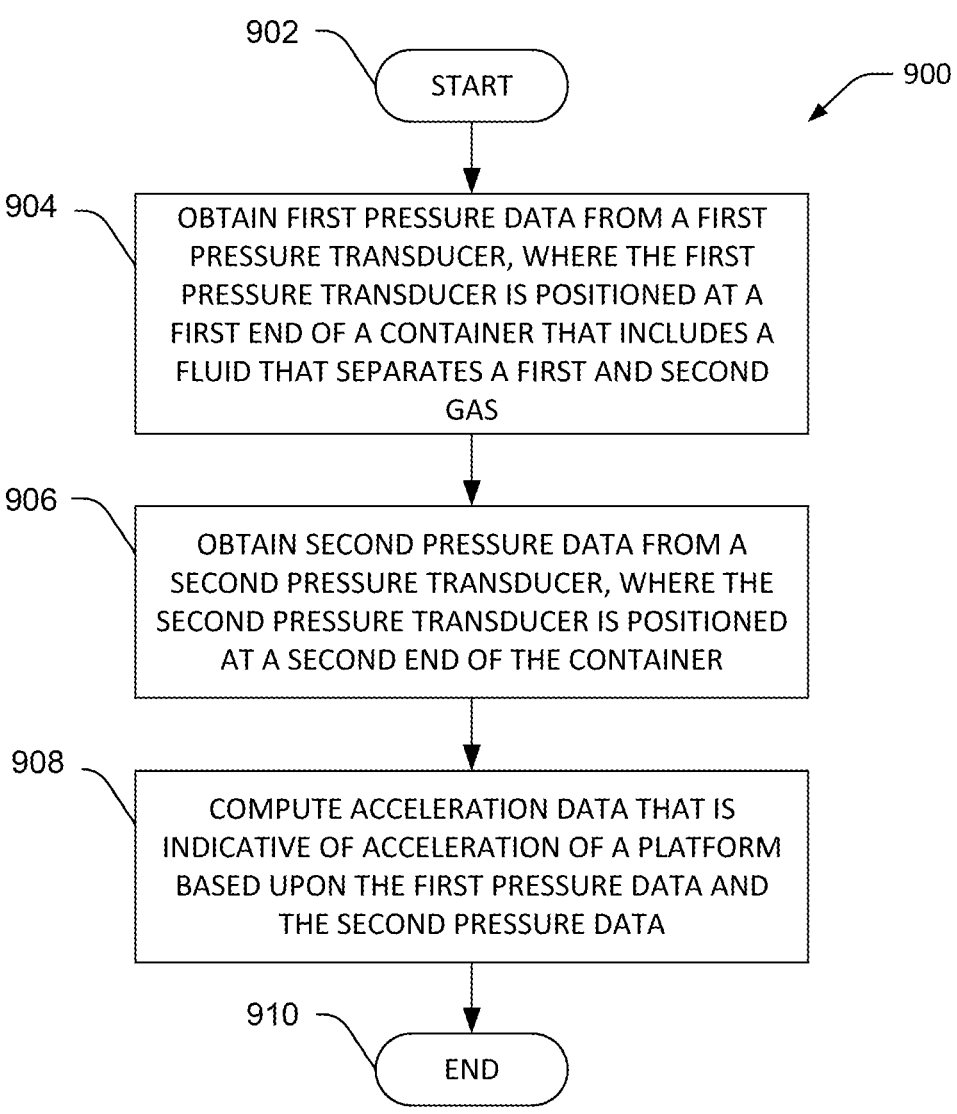

902

START

900

904

OBTAIN FIRST PRESSURE DATA FROM A FIRST PRESSURE TRANSDUCER, WHERE THE FIRST PRESSURE TRANSDUCER IS POSITIONED AT A FIRST END OF A CONTAINER THAT INCLUDES A FLUID THAT SEPARATES A FIRST AND SECOND GAS

906

OBTAIN SECOND PRESSURE DATA FROM A SECOND PRESSURE TRANSDUCER, WHERE THE SECOND PRESSURE TRANSDUCER IS POSITIONED AT A SECOND END OF THE CONTAINER

908

COMPUTE ACCELERATION DATA THAT IS INDICATIVE OF ACCELERATION OF A PLATFORM BASED UPON THE FIRST PRESSURE DATA AND THE SECOND PRESSURE DATA

910

END

FIG. 9

INTERTIAL SENSOR THAT INCLUDES FLUIDS

STATEMENT OF GOVERNMENT SUPPORT

This invention was made with Government support under Contract No. DE-NA0003525 awarded by the United States Department of Energy/National Nuclear Security Administration. The U.S. Government has certain rights in the invention.

BACKGROUND OF THE INVENTION

Field of the Invention

The present invention relates to an inertial sensor with a container containing two or more fluids.

Brief Description of the Related Art

An existing microscale accelerometer includes a spring that is coupled to a proof mass and a conductive plate, where position of the proof mass relative to the conductive plate changes under acceleration. As distance between the conductive plate and the proof mass changes under acceleration, the measured capacitance changes; thus, capacitance is correlated with acceleration. Another existing microscale accelerometer includes a proof mass that is coupled to piezoelectric material. The proof mass vibrates under acceleration, resulting in alteration of current emitted from the piezoelectric material. A magnitude of the current emitted from the piezoelectric material is correlated to acceleration of a platform that includes the accelerometer.

Constructing the microscale accelerometers referenced above, however, includes precisely constructing the proof mass, creating precise photolithography masks, performing precise etching, and so forth. Costs for equipment and processing associated with constructing the proof mass and creating photolithography masks is constant, however, regardless as to whether there are a small number of accelerometers manufactured or a large number of accelerometers manufactured. Thus, historically, per accelerometer cost for certain applications where accelerometers are used is incredibly high.

SUMMARY OF THE INVENTION

The following is a brief summary of subject matter that is described in greater detail herein. This summary is not intended to be limiting as to the scope of the claims.

Described herein are various technologies pertaining to an accelerometer that is adapted to output measurements of acceleration, where rather than including a proof mass, the accelerometer includes fluids (in gaseous and/or liquid form), and an acceleration measurement output by the accelerometer is based upon compression and expansion of at least one fluid in the accelerometer. With more specificity, the accelerometer includes a container, where the container has a first end and a second end that is opposite the first end, and further where the container is sealed at the first end and the second end. The container can be or include a glass capillary, a channel formed in silicon, etc. The container includes a first fluid, a second fluid, and a third fluid, where the first fluid is located at the first end of the container, the second fluid is located at the second end of the container, and the third fluid separates the first fluid from the second fluid in the container. In an example, the first fluid is adjacent to the third fluid in the container and the third fluid is adjacent to the second fluid in the container. The third fluid has a density that is higher than densities of the first fluid and the second fluid, and the third fluid is immiscible with the first fluid and the second fluid.

In a first example, the accelerometer includes a first pressure transducer that at least partially seals the container at the first end of the container, and further includes a second pressure transducer that at least partially seals the container at the second end of the container. In operation, when a platform that includes the accelerometer accelerates in a first direction along a length of the container from the first end towards the second end, the third fluid compresses the first fluid (e.g., a first volume that contains the first fluid compresses) while the second fluid expands (e.g., a second volume that contains the second fluid expands). Hence, an increase in acceleration in the first direction results in an increase in pressure at the first end of the container and a decrease in pressure at the second end of the container. The first pressure transducer outputs first pressure data that is indicative of a first pressure at the first end and the second pressure transducer outputs second pressure data that is indicative of a second pressure at the second end. Processing circuitry is in communication with the first pressure transducer and the second pressure transducer and computes a difference between the first pressure and the second pressure. The difference is indicative of acceleration in the first direction. Similarly, when the platform accelerates in a second direction that is opposite the first direction, the third fluid compresses the second fluid (e.g., the second volume that contains the second fluid compresses) while the first fluid expands (e.g., the first volume that contains the first fluid expands). Hence, an increase in acceleration in the second direction results in an increase in pressure at the second end of the container and a decrease in pressure at the first end of the container. The difference between the aforementioned pressures is indicative of acceleration in the second direction.

In a second example, the container has a sidewall that is at least partially transparent, and the third fluid is visually distinct from the first fluid and the second fluid (e.g., the third fluid has a different color than the first fluid and the third fluid). The accelerometer further includes an imaging system (e.g., at least one photodiode) that is configured to identify: 1) a first location of a first interface between the first fluid and the third fluid; and/or 2) a second location of a second interface between the third fluid and the second fluid. Similar to the first example, when the platform accelerates in the first direction, the interface between the first fluid and the third fluid moves in the second direction (and the interface between the third fluid and the second fluid moves in the second direction). The imaging system can compute location data that is indicative of location(s) of the interface(s), and such value(s) can be employed to compute a value of acceleration in the first direction.

Further, as will be described in greater detail below, various technologies pertaining to a gyroscope are described herein. The gyroscope includes a transparent ring that comprises a first fluid and a second fluid. The gyroscope additionally includes an imaging system that is configured to identify locations of the first fluid in the ring over time, where alteration in location of the first fluid over time is indicative of direction, velocity, and acceleration of the platform about an axis that extends through a center of the ring.

In an example, the accelerometer and/or gyroscope can be formed through semiconductor processing techniques and can therefore be characterized as micro electromechanical systems. For instance, the accelerometer can be formed by etching a channel in a semiconductor material (such as silicon), forming pressure transducers at ends of the channel (e.g., where the pressure transducers are formed of piezo-electric material), inserting the fluids into the channel, and then placing a layer of material over the channel to form a sealed container. In another example, the container includes a glass (or other suitable material) capillary, with at least one pressure transducer at least partially sealing an end of the capillary after the first, second, and third fluids have been inserted into the capillary. In still yet another example, the container includes a glass (or other transparent material) capillary, where the capillary is sealed by any suitable sealant subsequent to the first, second, and third fluids being inserted into the capillary.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIG. 9 is a flow diagram that illustrates a method for using an accelerometer.

DETAILED DESCRIPTION OF THE INVENTION

Figures 1, 2:
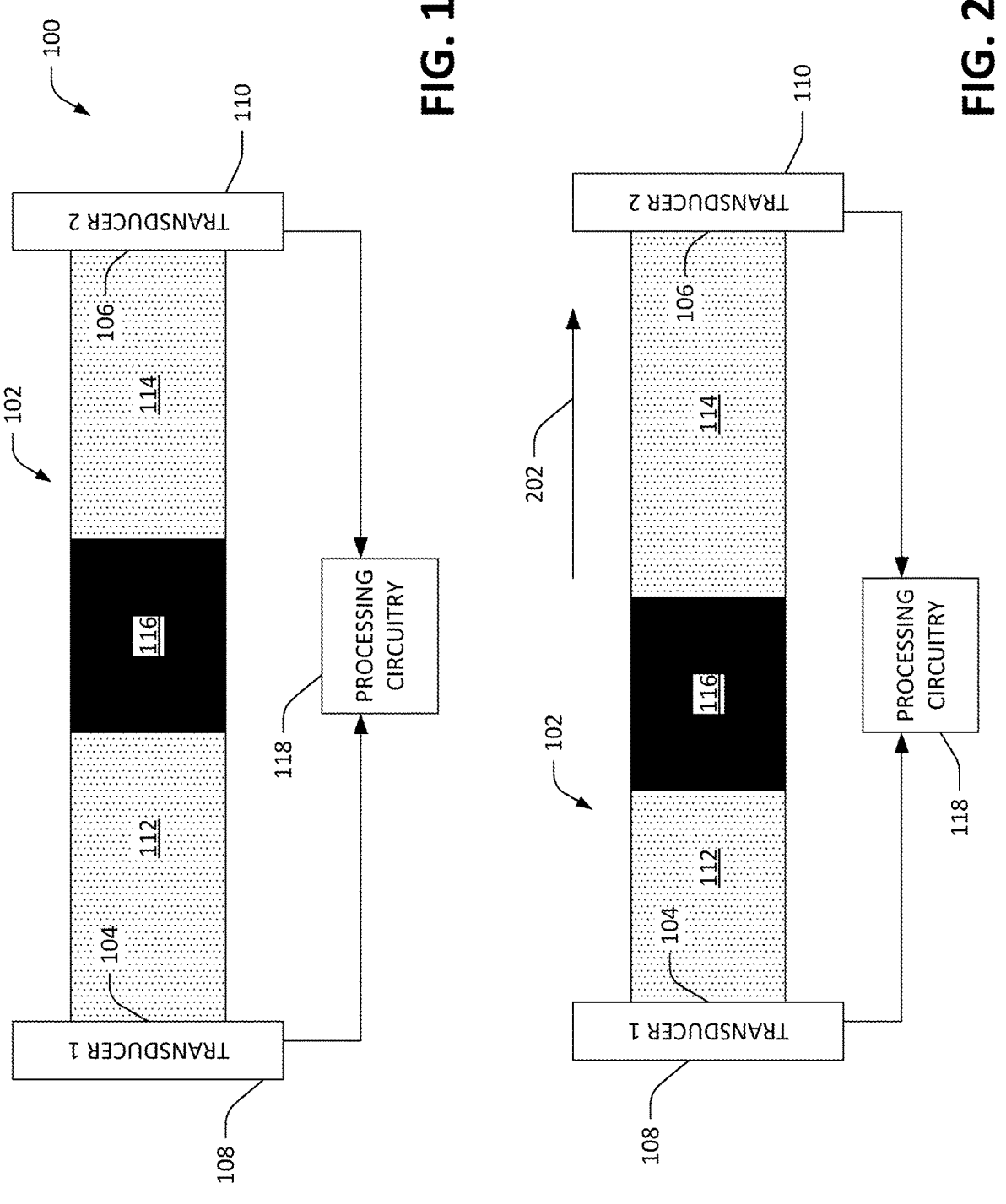
FIGS. 1 and 2 are schematics of an accelerometer.

Various technologies pertaining to inertial sensors, such as accelerometers and gyroscopes, are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various technologies related to inertial sensors are described herein. In an example, an accelerometer is described herein, where rather than including a proof mass and springs, the accelerometer includes a sealed container that includes a first fluid at a first end of the container, a second fluid at a second end of the container, and a third fluid in a middle region of the container, where the third fluid separates the first fluid from the second fluid in the container. The third fluid has a density that is greater than densities of the first and second fluids; for instance, the third fluid can be liquid while the first and second fluids can be gas. Further, the third fluid is largely immiscible with the first fluid and the second fluid. When a platform that includes the accelerometer is subject to an acceleration in a direction that extends along a length of the container (from the first end to the second end), the third fluid (due to the third fluid having a relatively high density compared to the first fluid and the second fluid) compresses one of the first fluid or the second fluid (while the other of the first fluid or the second fluid expands), thus creating a pressure differential between the first end and the second end of the container. Pressure transducers positioned at the first end and the second end output pressure data that is indicative of pressures at the two ends of the container, and differences in pressures between the two ends of the container are indicative of acceleration of the platform in the direction that extends along the length of the container. The accelerometer disclosed herein exhibits various advantages over conventional accelerometers, including relatively low cost to manufacture due to the lack of requirement of forming a proof mass of precise size and shape, forming springs of precise dimensions, and so forth.

With reference now to FIG. 1, a schematic of an accelerometer 100 is depicted. The accelerometer 100 includes a container 102 that has a first end 104 and a second end 106. The container 102 can be formed of any suitable material and can have any suitable shape. In an example, the container 102 is a cylindrical glass capillary. In another example, at least a portion of a sidewall of the container (where the sidewall extends from the first end 104 to the second end 106) is formed of silicon. In such an example, a cross-section of the container 102 through a width of the container 102 can be semicircular or rectangular. The container 102 is sealed at the first end 104 and the second end 106, thereby preventing fluid in the container 102 from exiting the container 102. As illustrated in FIG. 1, a first pressure transducer 108 can be positioned at the first end 104 of the container 102 and at least partially seals the container 102 at the first end 104 of the container 102. A second pressure transducer 110 can be positioned at the second end 106 of the container 102, where the second pressure transducer 110 at least partially seals the container 102 at the second end 106 of the container 102. The pressure transducers 108-110 can be formed of piezoelectric material, piezoresistive material, can be a capacitive sensor, etc.

The sealed container 102 includes three fluids that are adjacent to one another in the container 102. With more specificity, the sealed container 102 includes a first fluid 112 positioned adjacent to the first end 104 of the container 102, a second fluid 114 positioned adjacent to the second end 106 of the container 102, and a third fluid 116 positioned at a middle region of the container 102 (between the first end 104 and the second end 106), where the third fluid 116 separates the first fluid 112 from the second fluid 114 in the container 102. The third fluid 116 has a density that differs from densities of the first fluid 112 and the second fluid 114. In an example, the third fluid 116 has a density that is higher than densities of the first fluid 112 and the second fluid 114. Moreover, at least one of the fluids 112-116 can be a gas while another of the fluids 112-116 can be a liquid. For instance, the first fluid 112 and the second fluid 114 can be gases, while the third fluid 116 can be a liquid. In an example, the third fluid 116 is mercury, water, silicone oil, etc., while the first and second fluids 112 and 114 are/or include air, nitrogen, helium, argon, or other inert gases. Further, the third fluid 116 is largely immiscible with respect to the first fluid 112 and the second fluid 114.

At least one of the fluids 112-116 is placed in the container 102 prior, concurrently with, or subsequent to the container 102 being sealed. For instance, the third fluid 116 can be placed in a syringe and injected into the container 102 at the first end 104 prior to the container 102 being sealed, and subsequently the first pressure transducer 108 can be placed on the first end 104 to seal the container 102 at the first end 104. In another example, when the container 102 is formed by etching in a material (such as silicon), a channel (trough) is etched and the third fluid 116 is placed in a center region of the channel along a length of the channel (e.g., subsequent to the pressure transducers 108 and 110 being formed at the ends 104 and 106 of the container 102). Subsequently, a material can be placed over the trench, thereby sealing the container 102 (where the material acts as a lid). In yet another example, a sidewall of the container 102 is formed of a self-healing material, and the second fluid 114 is injected into the container 102 by way of a syringe after the container 102 has been sealed. The container 102 heals (and thus re-seals) upon the syringe being extracted from the interior of the container 102 through the sidewall.

The accelerometer 100 also includes processing circuitry 118 that is electrically coupled to the first pressure transducer 108 and the second pressure transducer 110, such that the processing circuitry 118 receives pressure data output by the transducers 108 and 110. As will be described in greater detail below, the processing circuitry 118 is adapted to compute acceleration data in a direction along a length of the container 102 (e.g., along an axis of the container 102 that extends between the ends 104 and 106 of the container 102). For instance, the processing circuitry 118 is adapted to compute a difference between pressure at the first end 104 of the container 102 and the second end 106 of the container 102 based upon first pressure data output by the first pressure transducer 108 and second pressure data output by the second pressure transducer 110, and is further configured to compute acceleration data that is indicative of acceleration in the direction along the length of the container 102 based upon the computed difference.

While the container 102 has been described above as including three fluids, in other embodiments, that container 102 may be limited to including only two fluids; in still other embodiments, the container 102 may include more than three fluids—for instance, the container 102 may include air, water, mercury, water, air (i.e., from left to right). Other arrangements are also contemplated.

With reference to FIG. 2, a schematic that depicts operation of the accelerometer 100 is illustrated. A platform that includes the accelerometer 100 accelerates in a direction of arrow 202. That platform may be an automobile, an aerial vehicle, a video game controller, a mobile telephone, or the like. Due to the third fluid 116 having higher density than the first fluid 112 (and the second fluid 114), the third fluid 116 compresses the first fluid 112. Hence, the first fluid 112 is constrained to a smaller volume when the first fluid is compressed, resulting in a higher pressure at the first end

104 of the container 102. Conversely, as the total volume of the container 102 remains static, as the first fluid 112 is compressed, a volume of the container 102 retaining the second fluid 114 expands, and the second fluid 114 expands to fill the larger volume. Accordingly, a drop in pressure occurs at the second end 106 of the container 102. As will be appreciated, when the acceleration is negative, i.e., a deceleration, the third fluid 116 will compress the second fluid 114, while causing the first fluid 112 to expand.

In an example, the first transducer 104 and the second transducer 106 include piezoelectric material. As the third fluid 116 compresses the first fluid 112, the first fluid presses on the first transducer 108, and the first transducer 108 outputs first pressure data that is indicative of a first pressure at the first end 104 of the container 102. Similarly, as the third fluid 116 compresses the first fluid 112, a "pulling" force is applied on the second transducer 110, and the second transducer 110 outputs second pressure data that is indicative of a second pressure at the second end 106 of the container 102. The processing circuitry 118 computes acceleration data based upon the first pressure data and the second pressure data, where the acceleration data is indicative of acceleration in the direction of the arrow 202. In an example, the processing circuitry 118 computes the acceleration data based upon a difference between the first pressure data and the second pressure data (or derivates of the first pressure data and the second pressure data). In another example, the processing circuitry 118 computes the acceleration data based upon only one of the first pressure data or the second pressure data. Thus, the container 102 may include a single pressure transducer at one of the ends of the container 102 (while the other end is closed or sealed by some other sealing mechanism).

A correlation between pressure differential and acceleration has been experimentally observed, and the processing circuitry 118 can compute acceleration data based upon the observed correlation. Specifically, the processing circuitry 118 can have access to a lookup table, where the lookup table includes pressure differential data and corresponding acceleration data, where such data were experimentally observed. The processing circuitry 118 can compute pressure differential data based upon pressure data output by the transducers 108 and 110, can identify data that corresponds to such pressure differential data in the lookup table, and can utilize interpolation to compute the acceleration data (which is indicative of acceleration in the direction of the arrow 202).

In another example, acceleration from a drop (e.g., where the accelerometer 100 falls towards the earth) can be computed by the processing circuitry 118 by solving first order differential equations. Specifically, the processing circuitry 118 can solve the following first order differential equation: a=m/F, where F represents forces, which can include pressure forces at each end of the third fluid 116 and the viscous loss force associated with velocity of the third fluid 116 (damping force), and thus:

$$Accel = 9.8 \times g - \frac{\text{Pressure}_{firstend}}{\text{mass}} + \frac{\text{Pressure}_{secondend}}{\text{mass}} - \frac{\alpha \times v \times (y')}{r_0^2},$$

where g is the number of g's of acceleration, $\text{Pressure}_{firstend}$ is the pressure at the first end 104 of the container 102, mass is the mass of the third fluid 116, $\text{Pressure}_{secondend}$ is the pressure at the second end 106 of the container 102, v is a viscosity value for the third fluid 116, y' is the velocity of the third fluid 116 in the container 102, r is the radius of the container 102, and a is a constant.

Figures 3, 4:
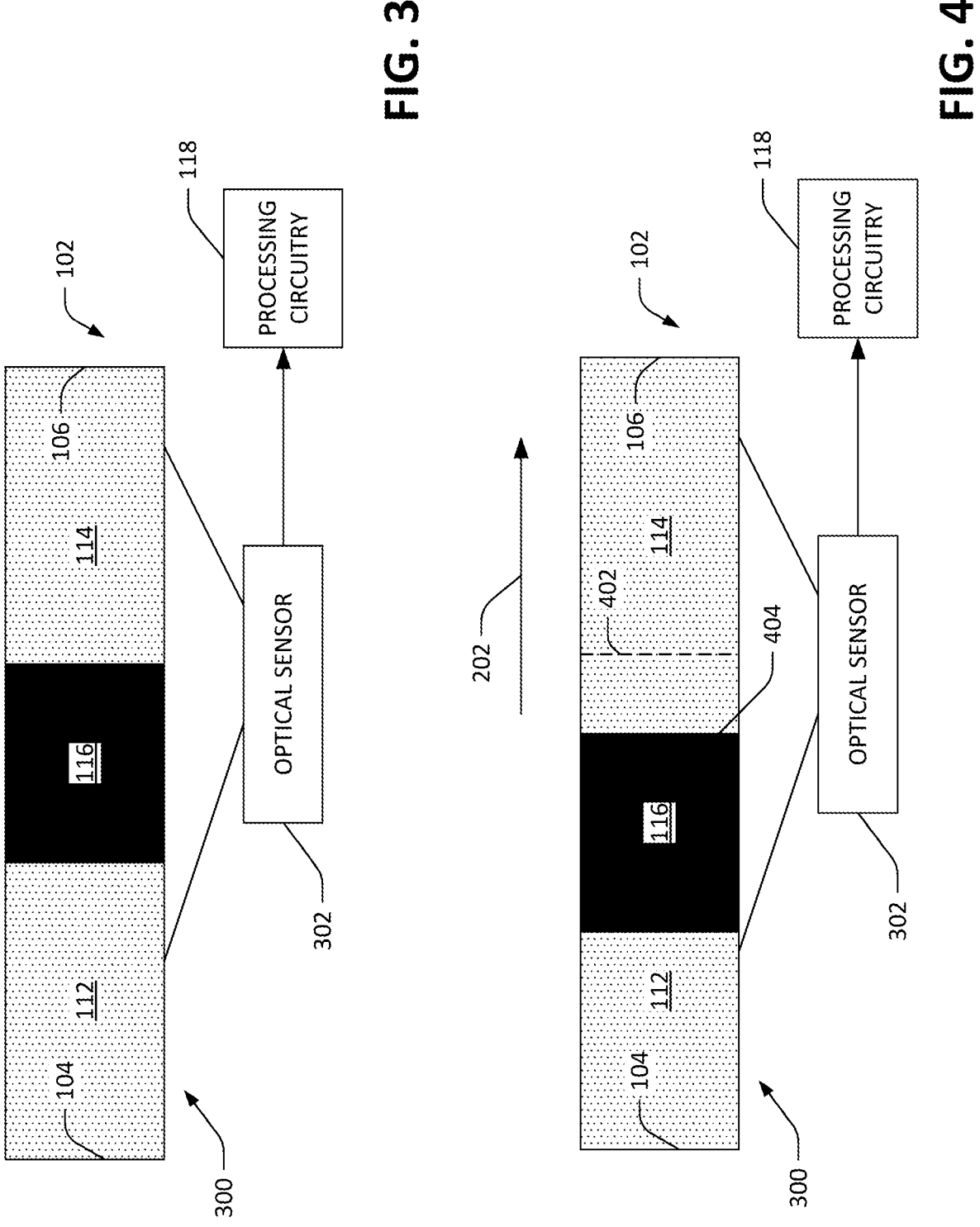
FIGS. 3 and 4 are schematics of another accelerometer.

With reference to FIG. 3, a schematic of another accelerometer 300 is depicted. The accelerometer 300 includes the container 102, the first fluid 112, the second fluid 114, and the third fluid 116. Notably, the accelerometer 300 is not depicted as including pressure transducers at the ends 104 and 106 of the container; it is to be understood, however, that in an example, the accelerometer 300 additionally includes the first pressure transducer 108 and/or the second pressure transducer 110 at the first end 104 and the second end 106, respectively, of the container 102.

The accelerometer 300 further includes an optical sensor 302 that is configured to identify a first location of an interface between the first fluid 112 and the third fluid 116 and/or a second location of an interface between the third fluid 116 and the second fluid 114. The optical sensor 302 can include a light emitter and a light detector, where the light emitter is adapted to emit pulses of light towards a (transparent) sidewall of the container 102 and the optical detector is adapted to detect reflections of the pulses of light. The processing circuitry 118 is configured to compute location data for the aforementioned interface(s) over time based upon the detected reflections and is further configured to compute acceleration data for a platform that includes the accelerometer 300 based upon the location data (where the acceleration data is indictive of acceleration of the platform in a direction that extends along a length of the accelerometer between the first end 104 and the second end 106). In another example, a light emitter is positioned on a first side of the container 102 and a light detector is positioned on a second side of the container 102, and the light detector detects light that passes through the (transparent) sidewalls of the container 102. The processing circuitry 118 computes the location data over time based upon light detected by the light detector.

Turning to FIG. 4, a schematic that illustrates operation of the accelerometer 300 is presented. A platform that includes the accelerometer 300 accelerates in a direction of the arrow 202. Based upon the acceleration of the platform, the first fluid 112 moves in a direction opposite the direction of the arrow 202, resulting in a change in locations of the boundaries of the first fluid 112 within the container 102 (relative to the optical sensor 302). More specifically, due to the acceleration, the interface between the third fluid 116 and the second fluid 114 moves from a first location 402 to a second location 404. The processing circuitry 118 receives location data output by the optical sensor 302, where the location data is indicative of locations of the interfaces between the third fluid 116 and the second fluid 114 and/or between the first fluid 112 and the third fluid 116 over time. Based upon the location data, the processing circuitry 118 computes acceleration data for the platform that includes the accelerometer 300, where the acceleration data is indicative of acceleration of the platform in the direction of the arrow 202. For example, the processing circuitry 118 can identify a largest difference between the first location 402 and a final location of the interface between the third fluid 116 and the second fluid 114 (e.g., the second location 404) and can compute acceleration data based upon such difference. In another example, the processing circuitry 118 can obtain location data over time and can compute acceleration data for the platform based upon the obtained location data. For instance, the processing circuitry 118 accesses a lookup table that maps locations of the interface with acceleration and can interpolate to compute acceleration data. In another example, statistical approaches are employed to compute the acceleration data.

Figure 5:
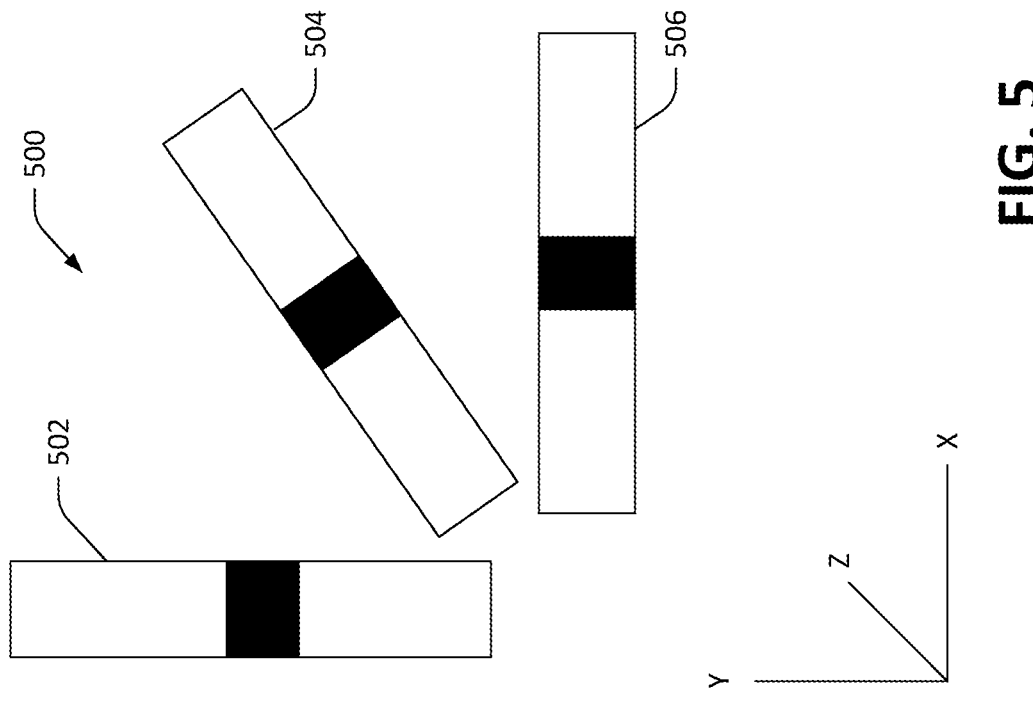
FIG. 5 depicts an example accelerometer system.

Now referring to FIG. 5, an accelerometer system 500 is illustrated, where the accelerometer system 500 includes three containers 502-506, with each of the containers 502-506 including the fluids shown in the container 102. While not illustrated, each of the containers 502-506 can include pressure transducers at the ends of the containers 502-506. In addition, while not shown, the accelerometer system 500 includes the processing circuitry 118, where the processing circuitry 118 computes acceleration data in X, Y, and Z directions. Pursuant to an example, the accelerometer system 500 is built into a semiconductor block, where the first container 502 and the second container 504 are created by etching troughs on a surface of the semiconductor block while the third container 506 is constructed by etching a channel in the Z direction through the semiconductor material. In another example, capillaries can be positioned to be aligned with X, Y, and Z axes. The processing circuitry 118 can compute an overall direction of acceleration based upon the acceleration data in the X, Y, and Z directions.

Figure 6:
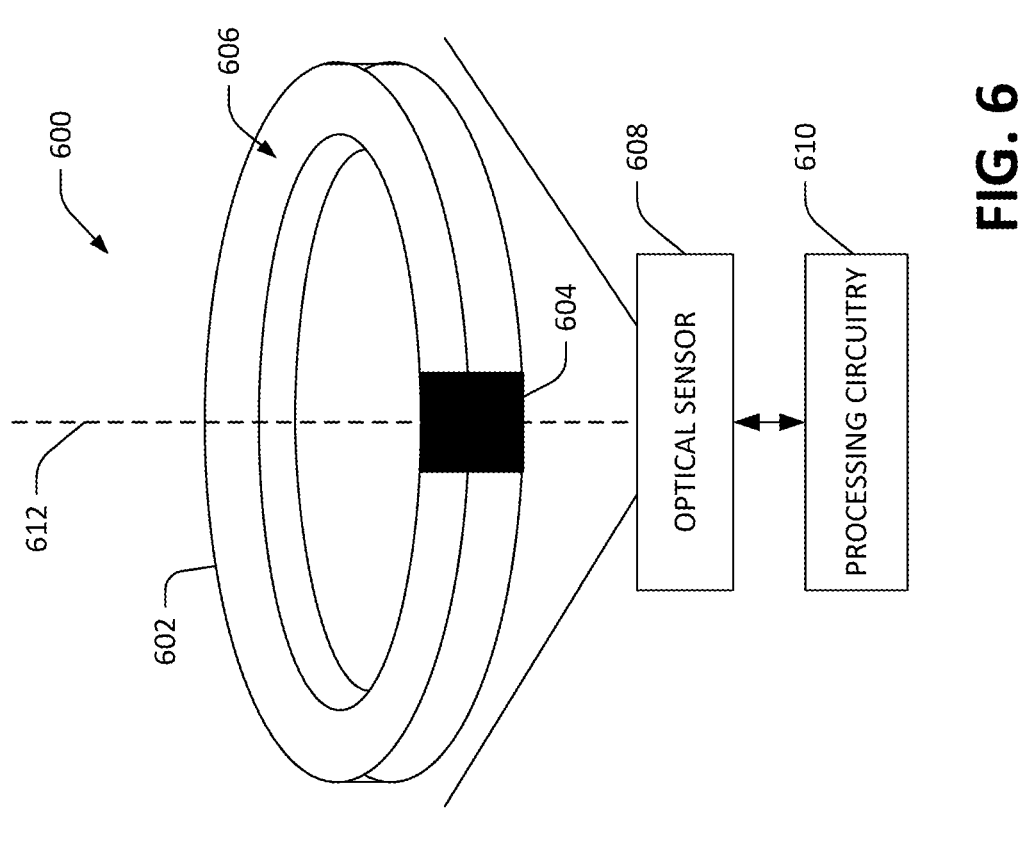
FIG. 6 depicts an example gyroscope.

Referring now to FIG. 6, a schematic that depicts a gyroscope 600 is presented. The gyroscope 600 comprises a transparent hollow ring 602, where the ring 602 includes a first fluid 604 and a second fluid 606. Density of the first fluid 604 is greater than density of the second fluid 606. In an example, the first fluid 604 is mercury and the second fluid 606 is air, although other fluids are contemplated. The gyroscope 600 further includes an optical sensor 608 that is configured to output location data that is indicative of locations of the first fluid 604 in the ring 602 (relative to the optical sensor 608) over time. The gyroscope 600 also includes processing circuitry 610 that is configured to compute motion data (e.g., rotational direction, rotational velocity, and/or rotational acceleration) of a platform that includes the gyroscope 600 about an axis 612 that extends orthogonally through a center of the ring 602 based upon the signals output by the optical sensor 608.

The motion data can also be tied to an electromagnetic actuator (for instance) that generates a force based on the motion data to counteract motion of the first fluid 604 and maintain the position of the first fluid 604-a feedback control system. The current for the electromagnetic actuator can be used as a measurement of acceleration.

In an example, the optical sensor 608 includes light emitters positioned on a first side of the ring 602 (e.g., below the ring 602) and includes light detectors positioned on a second side of the ring 602 (e.g., above the ring 602). Location data output by the light detectors are indicative of location of the first fluid 604 within the ring 602, as the first fluid 604 can absorb, reflect, and/or attenuate light while the second fluid 606 is transparent to light (or vice versa). The processing circuitry 610, in an example, computes a first location of the first fluid 604 at a first point in time and computes a second location of the first fluid 604 at a second point in time. Based upon an amount of change in the location and a difference between the first time and the second time, the processing circuitry 610 can compute motion data that is indicative of direction of rotation of the platform about the axis 612, motion data that is indicative of rotational velocity of the platform about the axis 612, and/or motion data that is indicative of rotational acceleration of the platform about the axis 612. While not illustrated, a gyroscope system can include multiple rings (e.g., three rings), where axes of the rings are orthogonal to one another.

Figure 7:
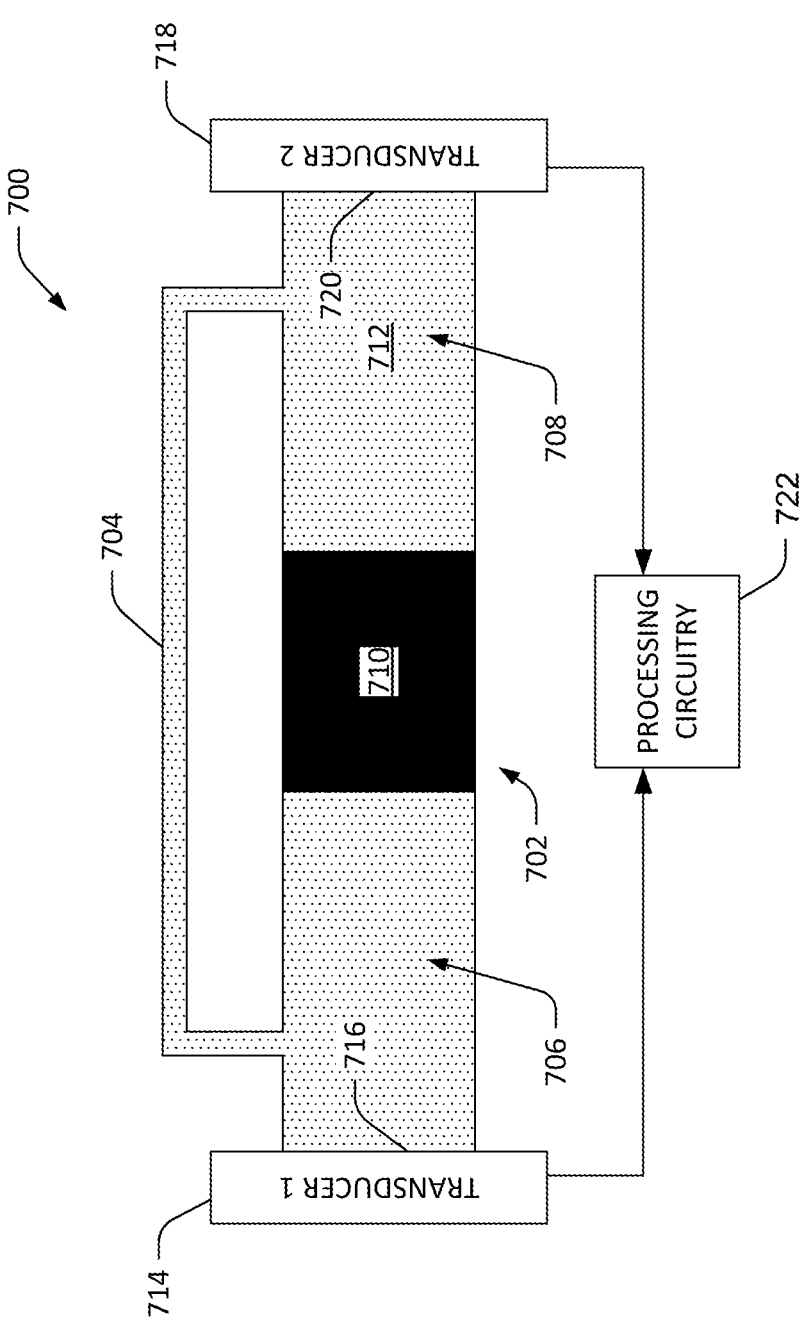
FIG. 7 is a schematic of yet another accelerometer.

With reference now to FIG. 7, a schematic of another accelerometer 700 is presented. The accelerometer 700 includes a container 702, where the container 702 includes a side channel 704 that allows for gaseous fluid to flow between a first volume 706 of the container 702 and a second volume 708 of the container 702. In the accelerometer 700, the container 702 includes a first fluid 710 that is centrally located along a length of the container 702 and a second fluid 712. The second fluid 712 can flow between ends of the container on either side of the first fluid 710 through the side channel 704. Surface tension associated with the second fluid 712, however, prevents the first fluid 710 from flowing through the side channel 704. Thus, diameter of the side channel 704 is less than diameter of a main body of the container 702.

The accelerometer 700 further includes a first transducer 714 located at a first end 716 of the container 702 and a second transducer 718 located at a second end 720 of the container 702. The accelerometer 700 further includes processing circuitry 722 that is in communication with the transducers 714 and 718, where the processing circuitry 722 is adapted to compute values of acceleration of a platform that includes the accelerometer 700 based upon signals output by the transducers 714 and 718 (e.g., where the transducers are pressure transducers).

The accelerometer 700 operates in a manner that is similar to the accelerometer 100 described previously; however, the first fluid 710 is able to move laterally in the container 702 more than the third fluid 116 of the accelerometer 100, as the second fluid 712 can flow through the side channel 704. Inclusion of the side channel 704 in the accelerometer 700 may allow for more precise measurements of acceleration, as the first fluid 710 is able to move more freely laterally greater distances from a central region of the container 702 when compared to accelerometers previously described herein. This configuration also allows measurement of integrated acceleration (acceleration x time, velocity) as the first fluid 710 moves along the container and is not pushed back to the original position once the acceleration event has occurred. Moreover, in addition to or rather than including transducers, the accelerometer 700 can include an optical sensor (as described with respect to the accelerometer 300 shown in FIG. 3). Still further, the container 702 can be included in the accelerometer system 500.

The accelerometers and gyroscopes described herein have numerous applications, examples of which are set forth below. It is emphasized that the accelerometers and gyroscopes are not limited to such applications, and that other applications are contemplated. In an example, the accelerometers and/or gyroscopes are well-suited for use in mobile devices, such as video game controllers, mobile telephones, and the like. The accelerometers and gyroscopes described herein are relatively inexpensive to manufacture and can be manufactured at the microscale. In another example, the accelerometers and/or gyroscopes can be used in an environment where switching is desirable, such as in connection with a vehicle airbag. In yet another example, the accelerometers and/or gyroscopes can be utilized in a construction environment where explosives are employed, such as in building deconstruction settings where detonations are to occur in stages. In such an application, an accelerometer can effectively be employed to detect sudden acceleration, where an explosive is detonated upon the accelerometer indicating that a sudden change in acceleration has been detected. Still further, as mercury is electrically conductive, the accelerometers and/or gyroscopes can be employed in electrical switching applications. Specifically, the use of mercury as the third fluid 116 could electrically interconnect two contacts formed on an interior surface of the container 102, thereby indicating that a predetermined acceleration had been measured.

Figure 8:
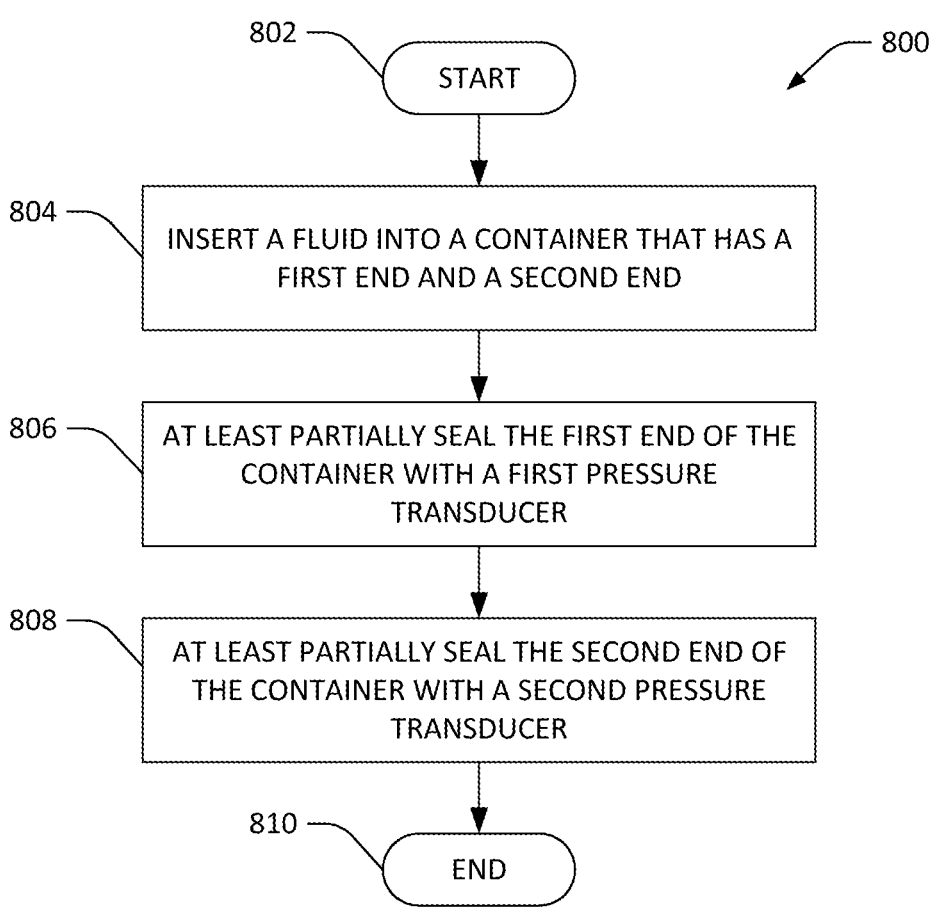
FIG. 8 is a flow diagram that illustrates a method for creating an accelerometer.

FIGS. 8 and 9 illustrate methods relating to accelerometers and/or gyroscopes. While the methods are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring solely to FIG. 8, a method 800 for forming an accelerometer is illustrated. The method 800 starts at 802, and at 804, a fluid is inserted into a container that has a first end and a second end. The fluid can separate the first gas from the second gas in the container. Further, the first gas is adjacent to the first end of the container and the second gas is adjacent to the second end of the container. In an example, the fluid is mercury and at least one of the first or second gas is air. At 806, the first end of the sensor is at least partially sealed with a first pressure transducer. At 808, the second end of the container is at least partially sealed with a second pressure transducer. While acts 806 and 808 are illustrated as occurring after act 804, it is to be understood that at least one of the first end or the second end can be sealed prior to the fluid being inserted into the container. Moreover, when the container is at least partially formed as an etched trough, the fluid can be inserted into the trough after the pressure transducers have been placed at opposing ends of the container, and the container can be sealed by placing a material over the trough (where the material acts as a lid). The method 800 completes at 810.

Turning to FIG. 9, a method 900 for computing acceleration data for a platform that includes a sensor system (e.g., an accelerometer) is illustrated. The method 900 starts at 902, and at 904, first pressure data is obtained from a first pressure transducer, where the first pressure transducer is positioned at a first end of a container and at least partially seals the container at the first end of the container. The first pressure data is indicative of a first pressure at the first end of the container, where the first pressure is caused by a fluid compressing a first gas at the first end of the container.

At 906, second pressure data is obtained from a second pressure transducer, where the second pressure transducer is located at a second end of the container (opposite the first end) and at least partially seals the container at the second end of the container. The second pressure data is indictive of a second pressure at the second end of the container, where the second pressure is caused by the fluid expanding a second gas at the second end of the container. As described above, the fluid separates the first gas from the second gas located at the second end of the container.

At 908, acceleration data that is indicative of acceleration of the platform is computed based upon the first signal and the second signal (e.g., based upon a difference between first pressure and the second pressure). The method 900 completes at 910. While the method 900 is described with reference to the use of pressure transducers, it is to be understood that a similar method may be implemented when an optical sensor is employed.

Technologies related to accelerometers and/or gyroscopes are described herein in accordance with at least the following examples.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A sensor system comprising:
a container having a first end and a second end that is opposite the first end, where the container comprises:
a first fluid that is adjacent to the first end of the container;
a second fluid that is adjacent to the second end of the container;
a third fluid that is positioned between the first fluid and the second fluid, where density of the third fluid is greater than densities of the first fluid and the second fluid, and further where the first fluid is separated from the second fluid in the container by the third fluid; and
a transparent sidewall along a length of the container; and
a sensor apparatus including an optical sensor that is adapted to output data that is indicative of acceleration of a platform that includes the sensor system, where the data is representative of
a location of an interface between the first fluid and the third fluid in the container.

2. The sensor system of claim 1, where each of the first and second fluids comprise at least one of nitrogen or hydrogen and the third fluid comprises mercury.

3. The sensor system of claim 1, where the sensor apparatus is adapted to output second location data that is representative of a second location of a second interface between the third fluid and the second fluid, and further where the second location data is indicative of the acceleration of the platform.

4. The sensor system of claim 1, further comprising processing circuitry that is adapted to compute acceleration data for the platform based upon the data, where the acceleration data is indicative of acceleration of the platform.

5. The sensor system of claim 1, where the acceleration of the platform is in a first direction that extends from the first end to the second end of the container, the sensor system further comprising:
a second container having a third end and a fourth end that is opposite the third end, where the second container extends laterally between the third end and the fourth end in a second direction that is orthogonal to the first direction, and further where the second container comprises:
fourth fluid that is adjacent to the third end of the second container;
fifth fluid that is adjacent to the fourth end of the second container; and
sixth fluid that is positioned between the fourth fluid and the fifth fluid, where density of the sixth fluid is greater than densities of the fourth fluid and the fifth fluid, and further where the fourth fluid is separated from the fifth fluid in the second container by the sixth fluid; and
a second sensor apparatus that is adapted to output second data that is indicative of a second acceleration of the platform in the second direction, where the second data is representative of
a location of a second interface between the fourth fluid and the sixth fluid in the second container.

6. The sensor system of claim 1, where the platform is one of an automobile, a mobile telephone, an aerial vehicle, or a video game controller.

7. The sensor system of claim 1, where the third fluid is largely immiscible with the first fluid and the second fluid.

8. The sensor system of claim 1, where the container comprises:
a trough etched into a semiconductor, where the semiconductor forms a first sidewall of the container; and
a layer of material attached to the semiconductor, where the layer of material forms a second sidewall of the container.

9. A sensor system comprising:
a container having a first end and a second end that is opposite the first end, where the container comprises:
a first fluid that is adjacent to the first end of the container;
a second fluid that is adjacent to the second end of the container;
a third fluid that is positioned between the first fluid and the second fluid, where density of the third fluid is greater than densities of the first fluid and the second fluid, and further where the first fluid is separated from the second fluid in the container by the third fluid; and
a sensor apparatus including a pressure transducer adapted to output data that is indicative of acceleration of a platform that includes the sensor system, the pressure transducer at least partially seals the container at the first end of the container, and further where the data is pressure data that is representative of a pressure at the first end of the container.

10. The sensor system of claim 9, where the sensor system further comprises a second pressure transducer that at least partially seals the container at the second end of the container, where the second pressure transducer is configured to output second pressure data that is indicative of the acceleration of the platform, and further where the second pressure data is representative of a pressure at the second end of the container.

11. The sensor system of claim 9, where the pressure transducer is a piezo sensor.

12. The sensor system of claim 11, where the piezo sensor is one of a piezoelectric sensor or a piezoresistive sensor.

13. The sensor system of claim 9, where each of the first and second fluids comprise at least one of nitrogen or hydrogen and the third fluid comprises mercury.

14. The sensor system of claim 9, where the container comprises:
a trough etched into a semiconductor, where the semiconductor forms a first sidewall of the container; and
a layer of material attached to the semiconductor, where the layer of material forms a second sidewall of the container.

15. The sensor system of claim 14, where the container further comprises:

a first piezoelectric sensor positioned at the first end of the container, where the first piezoelectric sensor at least partially seals the container at the first end of the container; and a second piezoelectric sensor positioned at the second end of the container, where the second piezoelectric sensor at least partially seals the container at the second end of the container.

16. The sensor system of claim 9, further comprising processing circuitry that is adapted to compute acceleration data for the platform based upon the data, where the acceleration data is indicative of acceleration of the platform.

17. The sensor system of claim 9, where the acceleration of the platform is in a first direction that extends from the first end to the second end of the container, the sensor system further comprising:

a second container having a third end and a fourth end that is opposite the third end, where the second container extends laterally between the third end and the fourth end in a second direction that is orthogonal to the first direction, and further where the second container comprises:

fourth fluid that is adjacent to the third end of the second container;

fifth fluid that is adjacent to the fourth end of the second container; and sixth fluid that is positioned between the fourth fluid and the fifth fluid, where density of the sixth fluid is greater than densities of the fourth fluid and the fifth fluid, and further where the fourth fluid is separated from the fifth fluid in the second container by the sixth fluid; and a second sensor apparatus that is adapted to output second data that is indicative of a second acceleration of the platform in the second direction, where the second data is representative of pressure at the third end of the second container caused by compression of the fourth fluid by the sixth fluid.

18. The sensor system of claim 9, where the platform is one of an automobile, a mobile telephone, an aerial vehicle, or a video game controller.

19. The sensor system of claim 9, where the third fluid is largely immiscible with the first fluid and the second fluid.

20. A sensor system comprising:

an accelerometer, where the accelerometer comprises:

a container that has a first end and a second end that is opposite the first end, where the container comprises:

first fluid that is adjacent to the first end of the container, where the first fluid has a first density;

second fluid that is adjacent to the second end of the container, where the second fluid has the first density; and third fluid that is positioned between the first fluid and the second fluid in the container, where the third fluid has a second density that is greater than the first density, and further where the first fluid is separated from the second fluid in the container by the third fluid; and a first sensor apparatus that that is adapted to output data that is indicative of acceleration of a platform that includes the accelerometer in a direction that extends through the first end and the second end, where the data is based upon compression of one of the first fluid or the second fluid by the third fluid;

a gyroscope, where the gyroscope comprises:

a hollow ring, where the hollow ring comprises a fourth fluid and a fifth fluid, where the fourth fluid has a third density, the fifth fluid has a fourth density, where the third density is greater than the fourth density; and a second sensor apparatus that is adapted to output location data that is indicative of locations of the fourth fluid in the hollow ring relative to the second sensor apparatus over time; and processing circuitry that is adapted to:

compute acceleration data for the platform, where the acceleration data is indicative of acceleration of the platform in the direction based upon the first signal output by the first sensor apparatus; and compute motion data that is indictive of at least one of direction of rotation or velocity of rotation of the platform about an axis that extends orthogonally through a center of the hollow ring.

* * * * *